No. 658,473. Patented Sept. 25, 1900.
W. D. F. SMITH & T. COVENTRY.
CHUCK.
(Application filed Jan. 22, 1900.)
(No Model.)
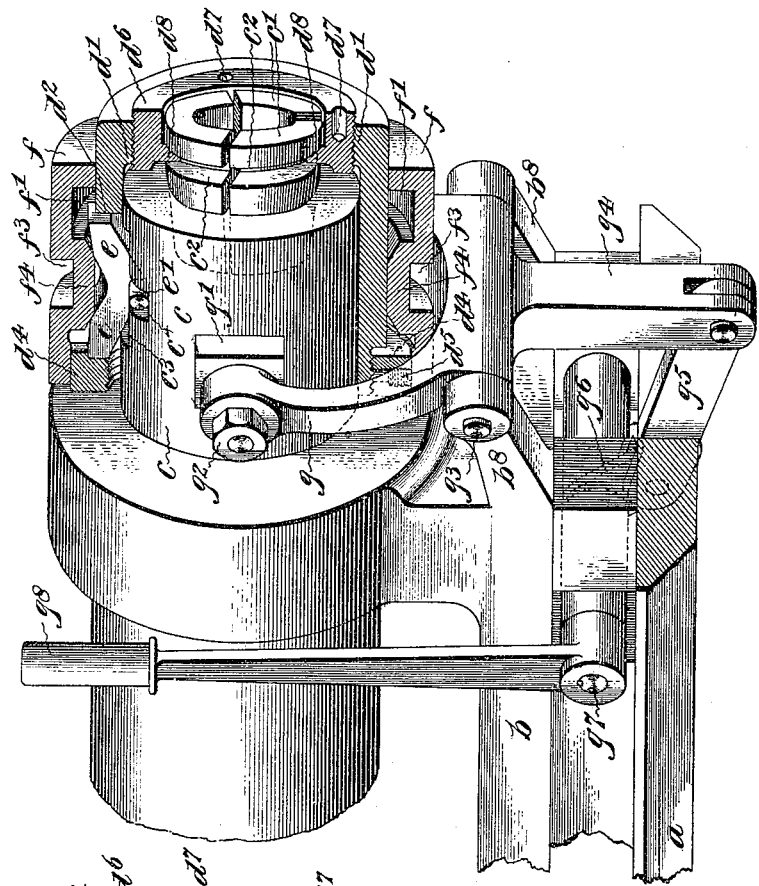
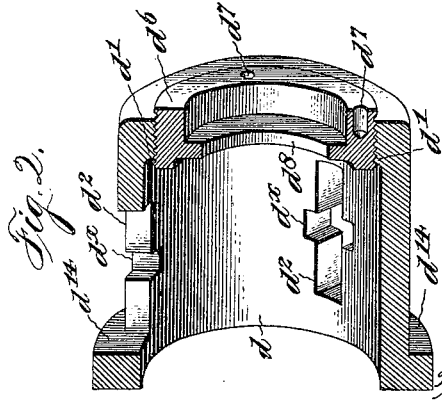
Witnesses
Inventors
William Dunstan Ford Smith.
Theodore Coventry.
by
Atty.
THE NORRIS PETERS CO., PHOTO-LITHO., WASHINGTON, D. C.

UNITED STATES PATENT OFFICE.

WILLIAM DUNSTAN FORD SMITH AND THEODORE COVENTRY, OF MANCHESTER, ENGLAND, ASSIGNORS TO SMITH & COVENTRY, LIMITED, OF SAME PLACE.

CHUCK.

SPECIFICATION forming part of Letters Patent No. 658,473, dated September 25, 1900.

Application filed January 22, 1900. Serial No. 2,349. (No model.)

*To all whom it may concern:*

Be it known that we, WILLIAM DUNSTAN FORD SMITH and THEODORE COVENTRY, subjects of the Queen of Great Britain, residing at Manchester, county of Lancaster, England, have invented certain new and useful Improvements in Chucks; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to chucks which are made to grip a bar or other article to be operated upon and release the same while the chuck is rotating, and is especially applicable to centrally-fed lathe-chucks having conical gripping-jaws sliding into the chuck-spindle and wedging against the work, being an improvement on the invention described in British Letters Patent No. 13,146, dated June 11, 1898, and granted to Theodore Coventry.

In order that our invention may be fully understood, reference will be made to the accompanying drawings, in which like parts are similarly designated, and in which—

Figure 1 shows in perspective so much of the head-stock of a lathe as will be necessary to a full understanding of the invention, with the improved chuck attached, some of the parts being shown in section. Fig. 2 is a perspective in section, showing a modification of the sleeve $d$.

$a$ is a portion of the lathe-bed, on which the head-stock slides, and $b$ is that portion of the stock that carries the front end or nose $c$ of the spindle, which is made tubular or partly tubular, as requirements demand. In that portion of the nose $c$ of the spindle projecting beyond the support $b$ are milled short longitudinal grooves $c^3$, intersected by grooves $c^4$. A portion of the front end of this spindle is bored conical, into which fit the gripping-jaws $c'$, whose outer surfaces have, preferably, the same pitch as the conical part of the spindle-bore and whose inner gripping-surfaces are shown as cylindrical. These jaws $c'$ are provided on their outer ends, which project beyond the nose of the spindle $c$, with grooves $c^2$ or their equivalents.

In the grooves $c^3$, which are preferably one hundred and twenty degrees apart, are the double toggle-levers $e$, whose trunnions $e'$ work in the slots $c^4$ and prevent longitudinal displacement of these levers, while allowing them to rock freely.

Over the nose of the spindle $c$ is fitted an axially-movable sleeve $d$, provided with an inwardly-projecting internally-threaded flange $d'$. Screwing into this flange $d'$ is an adjusting-ring $d^6$, which is of any desired width, according to the limit of adjustment required to be given to the jaws. This ring is shown provided with a flange $d^8$, that takes into the grooves $c^2$. Holes $d^7$ serve for the insertion of a suitable key to turn said ring, whereby the jaws are set farther in or out in order to vary the size of the central opening or the grip.

On or near the end of the sleeve $d$ is turned a threaded shoulder $d^3$, on which is screwed an abutment-ring $d^4$, held in place by the set-screw $d^5$, which allows of adjustment. However, this ring can be advantageously made solid with the sleeve $d$, as shown at $d^{14}$, Fig. 2, in which case the slots $d^2$ do not end at the edge of the sleeve $d$, as shown in Fig. 1, but are simply oblong slots ending at the bead $d^{14}$, Fig. 2. These slots $d^2$ when not extending to the rear end of the sleeve leave a rear wall for engagement by the levers $e$, which was otherwise formed by the ring $d^4$, and these slots or perforations register with the milled slots $c^3$ in the spindle, in both of which the double toggle-lever moves. In the middle of each slot $d^2$ there is a cross-slot $d^\times$, corresponding to slots $c^4$. This cross-slot is to allow the toggles $e$ to be placed in position when the sleeve $d$ is in the center position before the collar $f$, hereinafter mentioned, is placed in position.

Rotatable and axially movable on the sleeve $d$ is a collar $f$, having an external groove $f^3$ and an internal groove $f'$ on either side of an internal central flange $f^4$ to receive the ends of the toggle-levers $e$ and allow free movement when necessary.

Projecting from the head-stock $b$ of the lathe are two brackets $b^8$, between which is pivoted, by means of the pin $g^3$, a forked lever, whose fork $g$ carries in the perforated ends of its arms swivel-lugs $g'$, held in place in said arms by nuts $g^2$ and which take into the external groove $f^3$ to give axial motion to the collar $f$, while permitting rotation of the same. The other end of the lever $g^4$ is connected by a link $g^5$ to a bell-crank lever comprising the operating-lever $g^8$, keyed to a shaft $g^7$, journaled in the head-stock. Also keyed to this shaft $g^7$ at a suitable angle with the operating-lever is another lever $g^6$, whose opposite end is pivoted in the forked end of the link $g^5$. The angle that the lever $g^6$ makes with the link $g^5$ is large, so that when the mechanism has been thrown to close the jaws and grip the work the lever $g^6$ and link $g^5$ will be nearly in alinement, so as to get as much leverage as possible.

The operation is as follows, supposing the parts to be in the position shown in the drawings: The operating-lever $g^8$ is moved in the direction of the arrow, thus bringing the lever $g^6$ and link $g^5$ more into alinement to give a toggle action and force the end $g^4$ of the forked lever $g$ in an opposite direction, thereby moving the fork in the same direction as the operating-lever and carrying the collar $f$ with it, whereby the internal flange $f^4$ on collar $f$ forces the rear ends of the double toggle-levers down against the ring or abutment $d^4$, so as to move the sleeve $d$ in the same direction, which carries with it the adjusting-ring $d^6$ and the jaws $c'$. The conical jaws being forced into the conical bore of the spindle are crowded together, decreasing the diameter of the central opening between them, and wedged between the work and the spindle, thus making very efficient jaws. As shown, the motion of the conical jaws into the conical bore, hence the degree of wedging action of the jaws, is limited by the longitudinal motion of the sleeve, jaws, and adjusting-ring, and in order to adjust these jaws to hold work of varying diameters they are moved into or out of the conical bore of the spindle; but the limit of throw of the actuating parts is not varied thereby, though this can be done when using an abutment-ring $d^4$, which when screwed in or out will necessarily vary to a small extent the effective movement imparted by the double toggles. This variation of throw is, however, practically of little importance when an adjustment of the jaws will accomplish a similar result. Besides it is not always convenient to adjust from the rear of the chuck, and we therefore prefer to do away with this ring, as shown in Fig. 2, and adjust entirely from the ring $d^6$, which is easy and convenient of access. It is also obvious that the flange $d'$ may be omitted and the ring $d^6$ screwed into the end of the sleeve $d$. A reverse movement of the operating-lever $g^8$ will cause a movement of the parts in an opposite direction to that described above, whereby the flange $f^4$ will force the front end of the toggle-levers $e$ into engagement with the front walls of the slots $d^2$ to move the sleeve $d$ and jaws $c'$ outward and disengage the latter.

Having thus described our invention, what we claim as new therein, and desire to secure by Letters Patent, is—

1. In a chuck, the combination with a hollow spindle and a plurality of tapered gripping-jaws coöperating therewith; of a sleeve longitudinally slidable on the spindle, and a ring adjustable in said sleeve and arranged to positively move the jaws into and out of the spindle, substantially as set forth.

2. In a chuck, the combination with a hollow spindle and a plurality of gripping-jaws coöperating therewith; of a sleeve and an external bead on its rear end integral therewith, a plurality of slots ending at the bead, mechanism for reciprocating the sleeve, and an annular flanged adjusting-ring adapted to engage grooves in the jaws and positively move the jaws into and out of the spindle, substantially as set forth.

3. In a chuck, the combination with a hollow spindle, a sleeve thereon, slots therein and toggle-levers in said slots to slide the same; of a plurality of tapered grooved gripping-jaws in the spindle end, a ring externally threaded and adjustable in the end of said sleeve, and an internal flange between the ends of said ring, said flange engaging the grooves in the jaws, substantially as set forth.

4. In a chuck, the combination with a hollow spindle, of a sleeve provided with an external bead on one end, longitudinal slots ending at the base of the bead, double toggle-levers in said slots whose ends slide against the ends of said slots to move the sleeve, an internal threaded flange on the other end of said sleeve, conical-surfaced jaws, peripheral grooves therein, a threaded adjusting-ring in said internal flange, a flange in said ring adapted to engage the grooves in the jaws and hold and adjust the same, and mechanism for moving the levers, sleeve, ring and jaws, substantially as described.

In testimony that we claim the foregoing as our invention we have signed our names in presence of two subscribing witnesses.

WILLIAM DUNSTAN FORD SMITH.
THEODORE COVENTRY.

Witnesses:
PETER J. LINSEY,
WILLIAM FAULKNER.